United States Patent
Li et al.

(10) Patent No.: US 8,086,278 B2
(45) Date of Patent: Dec. 27, 2011

(54) HOLDING APPARATUS

(75) Inventors: Chin-Chen Li, Taipei County (TW); Chi-Yuan Wang, Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 331 days.

(21) Appl. No.: 12/465,693

(22) Filed: May 14, 2009

(65) Prior Publication Data

US 2010/0206999 A1   Aug. 19, 2010

(30) Foreign Application Priority Data

Feb. 19, 2009   (TW) .............................. 98202415 U

(51) Int. Cl.
    *H04M 1/00* (2006.01)
(52) U.S. Cl. .............. 455/569.1; 248/288.31; 455/575.1
(58) Field of Classification Search ................... 248/481, 248/479, 476, 288.31, 181.1, 181.2; 403/76, 403/90, 122; 361/679.29, 679.01, 679.06, 361/679.2, 679.23, 679.24, 679.25, 679.26, 361/679.27, 679.28; 455/569.1, 569.2, 575.1, 455/90.3, 575.9
See application file for complete search history.

(56) References Cited

U.S. PATENT DOCUMENTS

| | | | | |
|---|---|---|---|---|
| 6,157,163 | A * | 12/2000 | Blackwood | 320/115 |
| 6,328,270 | B1 * | 12/2001 | Elberbaum | 248/288.31 |
| 6,480,378 | B2 * | 11/2002 | Chang | 361/679.41 |
| 7,280,802 | B2 * | 10/2007 | Grady | 455/42 |
| 7,292,881 | B2 * | 11/2007 | Seil et al. | 455/575.1 |
| 2002/0032042 | A1 * | 3/2002 | Poplawsky et al. | 455/564 |

* cited by examiner

*Primary Examiner* — A. Joseph Wujciak, III
(74) *Attorney, Agent, or Firm* — Thomas, Kayden, Horstemeyer & Risley, LLP

(57) ABSTRACT

The invention discloses a holding apparatus, which includes a fixed body, a carrying stand and a signal cable. The fixed body includes a ball joint, extending portion and a cable tunnel. The cable tunnel, disposed within the fixed body, is connected to a first opening of the ball joint. The carrying stand includes a casing, a pivot component and a transmitting interface. The ball joint is pivotally connected to the pivot component through a second opening of the casing. The signal cable, disposed through the cable tunnel of the ball joint, is electrically connected to the transmitting interface within the carrying stand. When the carrying stand rotates relative to the fixed body, a limiting portion of the pivot component is used for stopping the extending portion, so as to limit a rotating angle of the carrying stand.

16 Claims, 5 Drawing Sheets

HOLDING APPARATUS

CROSS-REFERENCE TO RELATED APPLICATION

This application claims priority to Taiwan Application Serial Number 098202415, filed Feb. 19, 2009, which is incorporated herein by reference.

BACKGROUND OF THE INVENTION

1. Field of the Invention

The invention relates to a holding apparatus, and more particularly, to a holding apparatus capable of accommodating a signal cable and preventing over-rotating damage.

2. Description of the Prior Art

Nowadays with the prosperous and ever-developing information technologies, portable electronic applications are everywhere in our daily life. The handhold electronic device, e.g. personal digital assistant (PDA), Smartphone, mobile internet device (MID) or global positioning system (GPS), becomes a trend because of the compact size, various functions and the friendly user interface of the handhold electronic device, which is easy to carry for use whenever needed.

However, the handholding characteristic of these electronic devices may bring huge trouble to the user with busy hands. For example, the user may need the navigation from the PDA or the GPS while driving, however the user also have to focus his mind on handling the car with both hands and eyes. For the safety reasons, it needs a specific holding apparatus to cooperate with the electronic device.

Please refer to FIG. 1. FIG. 1 is an outside view illustrating a holding device 1 in prior art. As shown in FIG. 1, the holding device 1 includes a fixed body 10 and a carrying stand 12. The fixed body 10 can be fixed on an outer surface, for example, on the interior surface above the dashboard of a car. The carrying stand 12 is pivotally connected to the fixed body 10 in a way with a ball joint, such that the carrying stand 12 can freely rotate relative to the fixed body 10 within a certain angle.

With the more compact size and more utilities that the user demands that all the functions could be provided within a single handhold electronic device, thus the holding apparatus is no longer a simple accommodating structure to the industry. Besides the stable accommodating function and freely rotating space of the carrying stand, the industry requires the holding apparatus to be an add-on for the electronic device.

For example, some add-on electronic components, e.g. radio receiving antenna, wireless router, recharging module and loudspeaker, are disposed in the fixed body of the holding apparatus. When the user places the handhold electronic device on the carrying stand, the electronic device may be connected to the add-on electronic component disposed in the fixed body via an internal signal cable in the holding apparatus. In this way, the electronic device may receive radio signal, broadcast audio and execute various network functions.

In aforesaid case, the carrying stand may freely rotate relative to the fixed body. However, if the user keeps rotating the carrying stand clockwise (or counter-clockwise), for example rotating the carrying stand for 360 degrees relative to the fixed body, the internal signal cable would be twisted, even damaged or failed.

The invention discloses a holding apparatus capable of accommodating the cable signal and preventing the over-rotating damage, so as to solve aforesaid problems.

SUMMARY OF THE INVENTION

A scope of the invention is to provide a holding apparatus including a fixed body, a carrying holder and a signal cable. The signal cable is disposed between the fixed body and the carrying holder.

According to an embodiment of the invention, the fixed body includes a ball joint, an extending portion and a cable tunnel. The ball joint has a first opening thereon. The extending portion is conjoint with the ball joint. The cable tunnel is disposed within the fixed body and connected to the first opening of the ball joint. On the other hand, the carrying holder includes a casing, a pivot component and a transmitting interface. The casing has a second opening. The pivot component is used to pivotally connect the ball joint through the second opening. The pivot component has a limiting portion. The signal cable is disposed inside and along the cable tunnel of the ball joint and is electrically connected to the transmitting interface of the carrying holder.

When the carrying holder rotates in a first direction relative to the fixed body, the limiting portion stops the extending portion linked with the ball joint, so as to limit a rotating angle of the carrying holder. In this embodiment, the rotating angle is not over 360 degrees.

Another scope of the invention is to provide a holding apparatus including a fixed body and a carrying holder.

According to an embodiment of the invention, the fixed body includes a ball joint, an extending portion, a linking portion and a cable tunnel. The linking portion, which has a first opening, is used for linking the extending portion and the ball joint. The cable tunnel is disposed within the fixed body and connected to the first opening. On the other hand, the carrying holder includes a casing and a pivot component. The casing has a second opening. The pivot component is used to pivotally connect the ball joint through the second opening. The pivot component has a limiting portion. When the carrying holder rotates in a first direction relative to the fixed body, the limiting portion stops the extending portion linked with the ball joint, so as to limit a rotating angle of the carrying holder.

Another scope of the invention is to provide a holding apparatus including a fixed body and a carrying holder.

According to another embodiment of the invention, the fixed body includes a ball joint and a cable tunnel. The ball joint has a first opening thereon. The cable tunnel is disposed within the fixed body and connected to the first opening of the ball joint. On the other hand, the carrying holder includes a casing and a pivot component. The casing has a second opening. The pivot component is used to pivotally connect the ball joint through the second opening. The pivot component has a limiting portion. When the carrying holder rotates in a first direction relative to the fixed body, the limiting portion stops the ball joint, so as to limit a rotating angle of the carrying holder.

Compared with prior art, the holding apparatus of the invention utilizes the limiting portion disposed in the carrying holder and the ball joint disposed in the fixed body to limit each other, such that the continuing rotating angle between the carrying holder and the fixed body is limited under 360 degrees, so as to prevent the over-rotation during manipulating the holding apparatus and further to protect the signal cable disposed between the carrying holder and the fixed body. Accordingly, the holding apparatus can provide various and stable add-on functions in cooperation with the electronic device.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
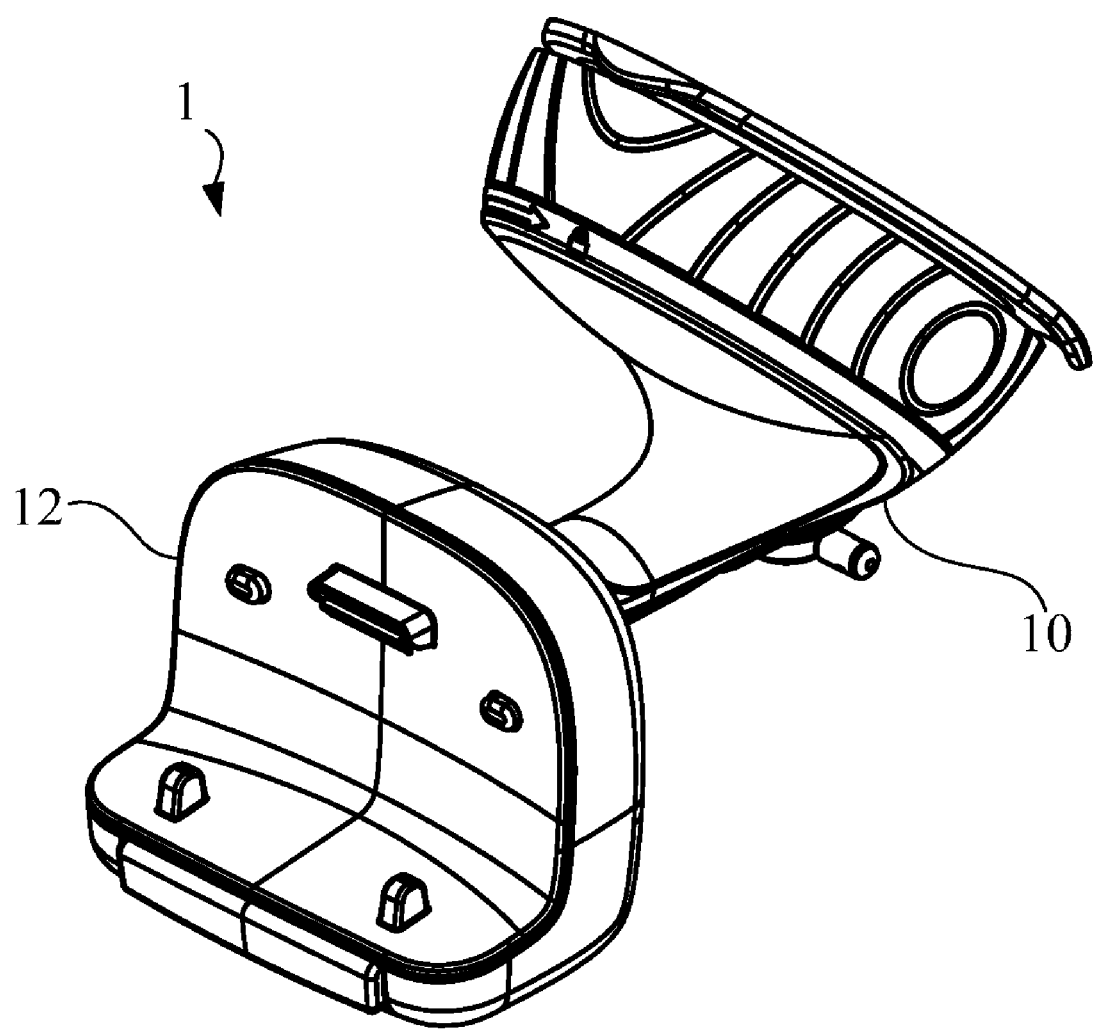
FIG. 1 is an outside view illustrating a holding device in prior art.
Figure 2:
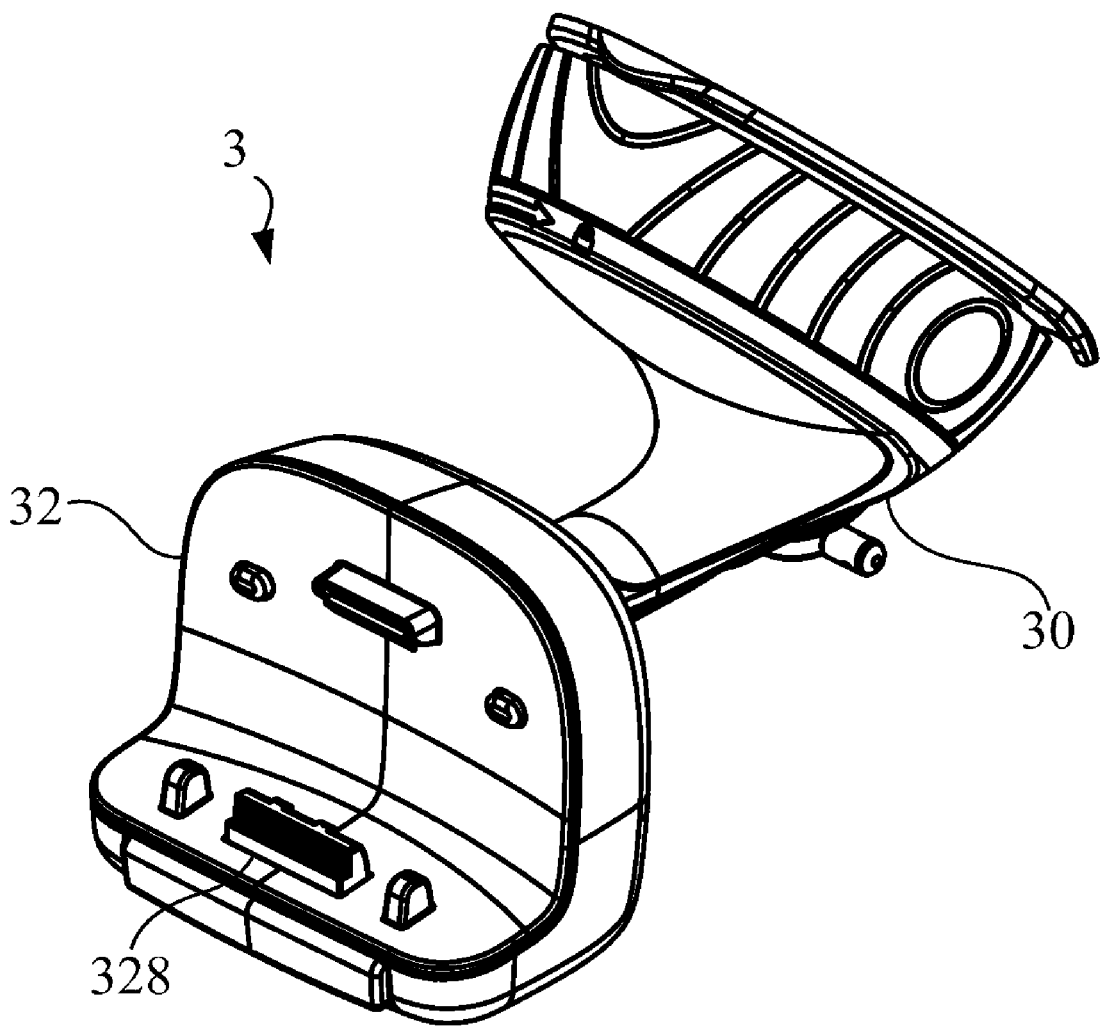
FIG. 2 is an outside view illustrating a holding apparatus according to an embodiment of the invention.
Figure 3:
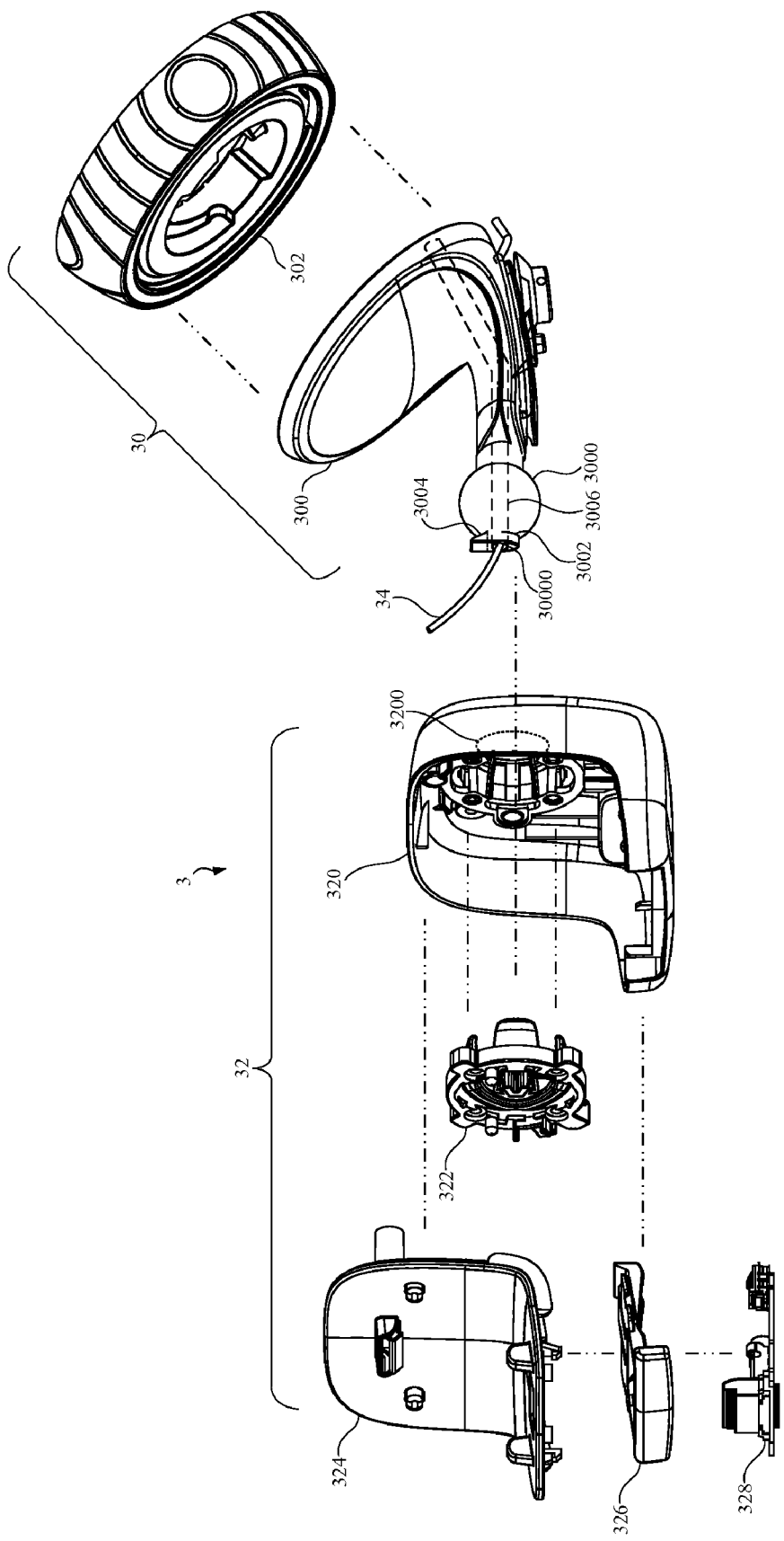
FIG. 3 is an explored diagram illustrating the holding apparatus in FIG. 2.

Please refer to FIG. 2 and FIG. 3. FIG. 2 is an outside view illustrating a holding apparatus 3 according to an embodiment of the invention. FIG. 3 is an explored diagram illustrating the holding apparatus 3 in FIG. 2.

As shown in FIG. 2, the holding apparatus 3 includes a fixed body 30 and a carrying holder 32. The carrying holder 32 in the embodiment has a transmitting interface 328. Please refer to FIG. 3. The fixed body 30 in the embodiment includes a connecting rod 300 and a base stand 302.

Figure 4:
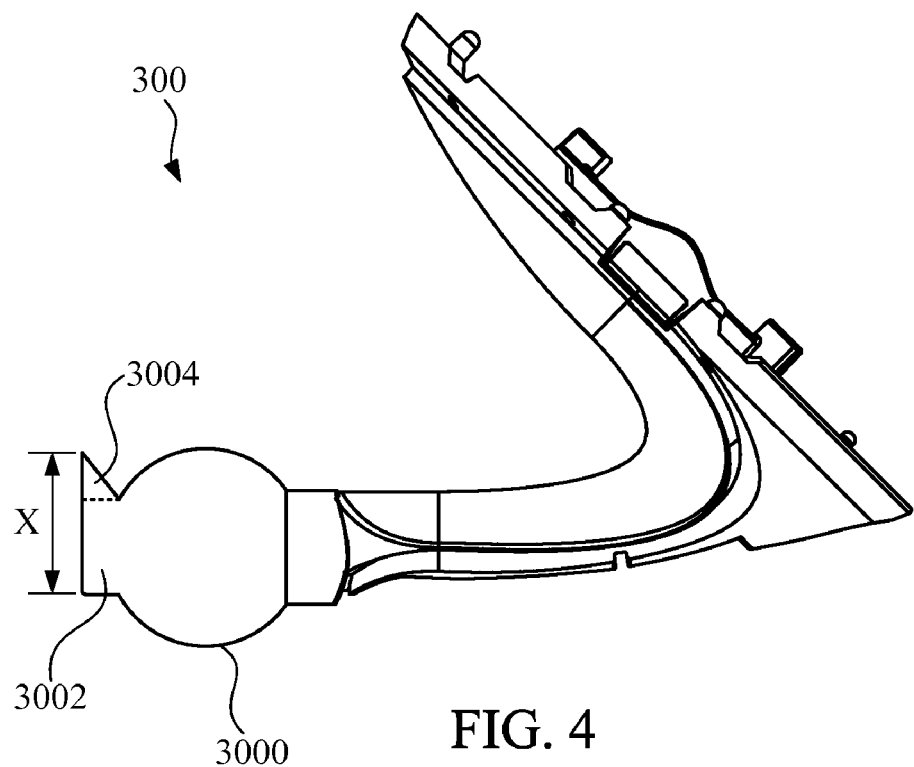
FIG. 4 is a side view illustrating the connecting rod in FIG. 3.

Please refer to FIG. 4. FIG. 4 is a side view illustrating the connecting rod 300 in FIG. 3. The connecting rod 300 includes a ball joint 3000, a linking portion 3002, an extending portion 3004 and a cable tunnel 3006. The cable tunnel 3006 is disposed within the fixed body 30. One end of the linking portion 3002 is conjoint with the ball joint 3000. The other end of the linking portion 3002 is formed a first opening 30000 (one end of the cable tunnel 3006) for the cable tunnel 3006. The extending portion 3004 is protruded from the linking portion 3002 for preventing the over-rotation. In an embodiment, the ball joint 3000, the linking portion 3002 and the extending portion 3004 are formed in one piece. In another embodiment, the linking portion 3002 and the extending portion 3004 are formed in one piece, which is further assembled with the ball joint 3000.

To be more precise in the embodiment, the cable tunnel 3006 goes from the base stand 302, via the connecting rod 300, and to the first opening 30000 on the linking portion 3002. As shown in FIG. 3, the holding apparatus 3 further includes a signal cable 34, which is disposed inside and along the cable tunnel 3006. The signal cable 34 is used for connecting between the fixed body 30 and the carrying holder 32. The signal cable 34 can be electrically connected to the transmitting interface 328 of the carrying holder 32.

The carrying holder 32 in the embodiment includes a casing 320, a pivot component 322, a top cap 324, a front casing 326 and the transmitting interface 328. As shown in FIG. 3, the transmitting interface 328 may include a printed circuit board (PCB). In other embodiment, the transmitting interface 328 can be some equivalent signal transceivers or circuit interfaces. There can be some signal terminals disposed on the PCB for electrically connecting with the signal cable 34 and an external electronic device (not shown). There can also be some corresponding signal wirings, a control unit or a signal processing unit disposed on the PCB based on the practical application.

The front casing 326 is used for fixing the transmitting interface 328 onto the casing 320. The top cap 324 is disposed above the front casing 326 and fixed on the casing 320. The top cap 324 may correspond to the shape of the external electronic device (e.g. length, width, shape or thickness) for the external electronic device to be placed within and electrically connected with the transmitting interface 328 of the carrying holder 32.

The casing 320 has a second opening 3200 corresponding to the ball joint 3000 of the connecting rod 300. The pivot component 322 can be fixed corresponding to the second opening 3200 of the casing 320 in a way of locking or engaging. The pivot component 322 cooperates with the casing 320 to form a pivotal space. Accordingly, the ball joint 3000 penetrates through the second opening 3200 of the casing 320 and is pivotally connected within the pivotal space formed by the pivot component 322 and the casing 320.

Figure 5:
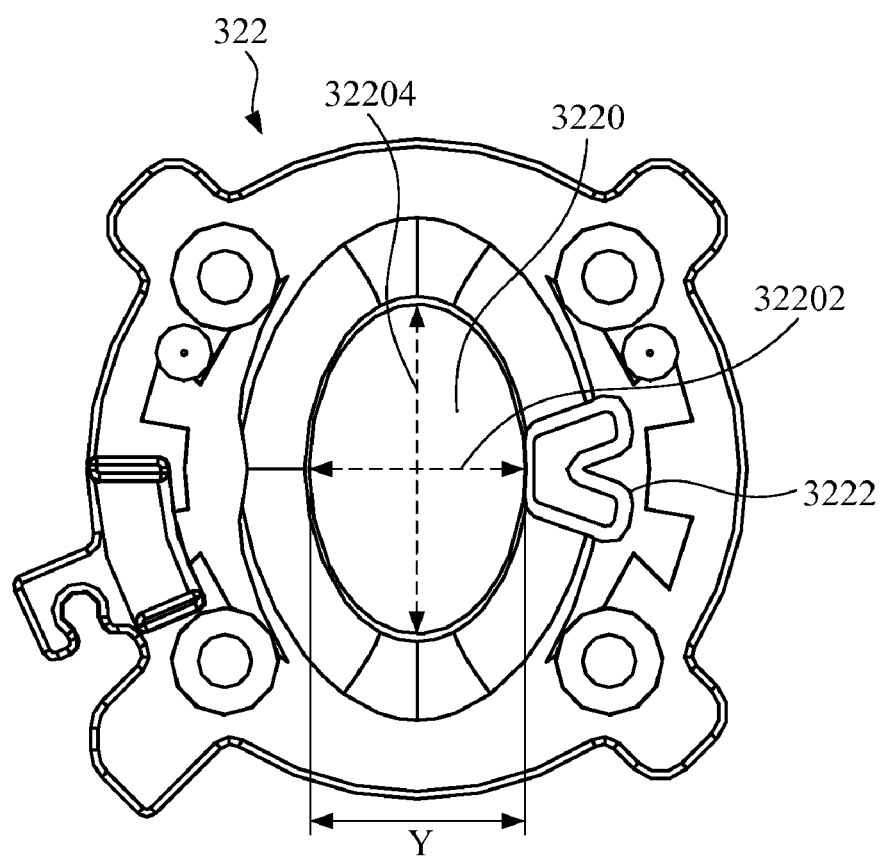
FIG. 5 is a top view illustrating the pivot component in FIG. 3.

Please refer to FIG. 5. FIG. 5 is a top view illustrating the pivot component 322 in FIG. 3. The pivot component 322 has a through hole 3220. The linking portion 3002 and the extending portion 3004, which are linked with the ball joint 3000, penetrates the through hole 3220. The pivot component 322 further has a limiting portion 3222. The limiting portion 3222 is disposed at periphery the through hole 3220.

Figure 6:
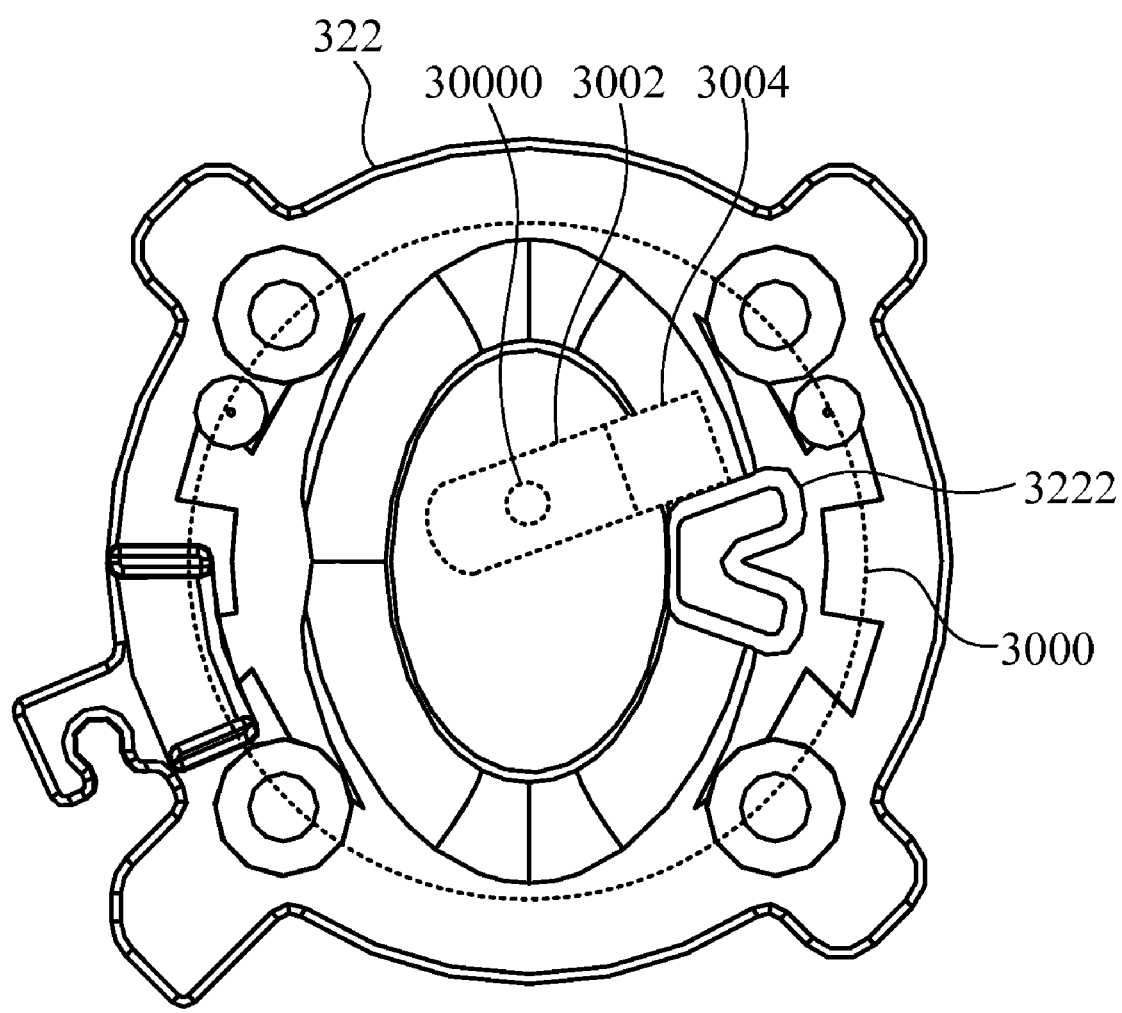
FIG. 6 is a schematic diagram illustrating the pivotal connection between the pivot component and the ball joint.

Please refer to FIG. 6. FIG. 6 is a schematic diagram illustrating the pivotal connection between the pivot component 322 and the ball joint 3000. Based on aforesaid structures, when the ball joint 3000 is pivotally connected within the pivotal space formed by the pivot component 322 of the carrying holder 32, the linking portion 3002 and the extending portion 3004 is movably located in the through hole 3220 (as shown in FIG. 6). When the carrying holder 32 rotates in a clockwise or a counter-clockwise direction relative to the fixed body 30 to a certain rotating angle, the limiting portion 3222 of the pivot component 322 stops the extending portion 3004 linked with the ball joint 3000. Accordingly, the rotating angle of the carrying holder 32 is limited. In this embodiment, the rotating angle is not over 360 degrees. In other words, the holding apparatus 3 in the invention can prevent the carrying holder 32 from rotating in one direction over 360 degrees. Therefore, it can protect the signal cable 34 disposed between the fixed body 30 and the carrying holder 32 from being damaged because of the over-rotation.

In this embodiment, even though the limiting portion 3222 is used for stopping the extending portion 3004 for avoiding the over-rotation, the limiting portion 3222 is not going to limit the normal rotating angle of the carrying holder 32 relative to the fixed body 30. The active rotating angle in this embodiment can be approximately 360 degrees. The holding apparatus 3 in the embodiment aims at preventing the over-rotation along one specific direction (e.g. rotate clockwise or counter-clockwise direction for 3 rounds, 1080 degrees), and remains the maximal rotating angle. In practical applications, the holding apparatus 3 can be widely implemented in an internal space of a vehicle as a vehicular holding apparatus for holding the electronic device.

To be noticed that, in the embodiment, the through hole 3220 of the pivot component 322 is an oval-shaped through hole as shown in FIG. 5. The oval-shaped through hole has a minor axis 32202. The minor axis 32202 has a length Y. The limiting portion 3222 is disposed at periphery the through hole 3220 and located at a position of the extension direction of the minor axis 32202. In this embodiment, the length Y of the minor axis 32202 is shorter than a total length X formed by the extending portion 3004 and the linking portion 3002 (as shown in FIG. 4). Because the limiting portion 3222 is disposed at periphery the through hole 3220, the length of the extending portion 3004 with that of the linking portion 3002 must be long enough to be stopped by the limiting portion 3222 of the pivot component 322, so as to avoid the over-rotation between the carrying holder 32 and the fixed body 30.

Besides, the oval-shaped through hole has a longer major axis 32204 perpendicular to the minor axis 32202. In practical applications, the oval-shaped design can allow the carrying holder 32 a larger vertical rotating space, such that it will be easier to adjust the carrying holder 32 for a better visual angle of the user. However, the arrangement of the oval-shaped through hole is not limited to this embodiment (vertical major axis, horizontal minor axis); it can be arranged in some other ways (e.g. horizontal major axis, vertical minor axis) in different usages. Furthermore, although the major axis 32204 can be longer than the minor axis 32202 for enlarging the rotating range, the major axis 32204 can not be over-lengthen, so as to ensure that the limiting portion 3222 is capable of stopping the extending portion 3004.

In another embodiment, the through hole of the pivot component can be a round through hole. The limiting portion is disposed at periphery the circle. In the embodiment of, the total length of the extending portion and the linking portion must longer than the diameter of the round through hole, so as to achieve the equivalent function of avoiding the over-rotation.

Please refer to FIG. 3. The base stand 302 in the fixed body 30 may further includes electronic components, such as radio receiving antenna, wireless router, recharging module or loudspeaker. The signal cable 34 may carry the signal generated by the electronic components through the fixed body 30 to the interface 328 of the carrying holder 32.

To sum up, the holding apparatus 3 of the invention can carry the external electronic device and also expand the utility of the external electronic device. For example, the holding apparatus 3 may couple the external electronic device (e.g. mobile phone) to the radio receiving antenna, which is disposed within the fixed body 30 away from the carrying holder 32. Consequently, the interference from the radio receiving antenna, which is disposed away from the external electronic device on the carrying holder 32, to the operating external electronic device is reduced. Accordingly, the operating efficiency and the communication quality are improved.

Compared with prior art, the holding apparatus of the invention utilizes the limiting portion disposed in the carrying holder and the ball joint disposed in the fixed body to limit each other, such that the continuing rotating angle between the carrying holder and the fixed body is limited under 360 degrees, so as to prevent the over-rotation during manipulating the holding apparatus and further to protect the signal cable disposed between the carrying holder and the fixed body. Accordingly, the holding apparatus can provide various and stable add-on functions in cooperation with the electronic device.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A holding apparatus for supporting a handheld electronic device, comprising;
   a fixed body comprising:
      a ball joint having a first opening thereon;
      an extending portion conjoint with the ball joint and extending from a border of the first opening; and
      a cable tunnel disposed within the fixed body and connected to the first opening of the ball joint;
   a carrying holder comprising:
      a casing having a second opening;
      a pivot component disposed within the casing for pivotally connecting the ball joint through the second opening, the pivot component having a limiting portion and a through hole, the extending portion penetrating the through hole, the limiting portion of the pivot component being disposed at a periphery of the through hole; and
      a transmitting interface; and
   a signal cable, disposed inside and along the cable tunnel of the ball joint, for electrically connecting to the transmitting interface of the carrying holder;
      wherein when the carrying holder rotates along a first direction relative to the fixed body, the limiting portion stops the extending portion, so as to limit a rotating angle of the carrying holder.

2. The holding apparatus of claim 1, wherein the rotating angle is not over 360 degrees.

3. The holding apparatus of claim 1, wherein the through hole of the pivot component is a round through hole.

4. The holding apparatus of claim 1, wherein the through hole of the pivot component is an oval-shaped through hole, the oval-shaped through hole having a minor axis, the limiting portion being located at a position of an extension direction of the minor axis.

5. The holding apparatus of claim 1, wherein the direction is a clockwise direction or a counter-clockwise direction.

6. The holding apparatus of claim 1, wherein the linking portion and the extending portion are formed in one piece.

7. A holding apparatus for supporting a handheld electronic device, comprising;
   a fixed body comprising:
      a ball joint;
      a linking portion conjoint with the ball joint, the linking portion having a first opening;
      an extending portion conjoint with the ball joint and extending from a border of the first opening; and
      a cable tunnel disposed within the fixed body and connected to the first opening of the linking portion;
   a carrying holder comprising:
      a casing having a second opening; and
      a pivot component disposed within the casing for pivotally connecting the ball joint through the second opening, the pivot component having a limiting portion and a through hole, the linking portion and the extending portion penetrating the through hole, the limiting portion of the pivot component being disposed at a periphery of the through hole; and
      wherein when the carrying holder rotates along a first direction relative to the fixed body, the limiting portion stops the extending portion, so as to limit a rotating angle of the carrying holder.

8. The holding apparatus of claim 7, wherein the fixed body further comprises a base used for fixing the holding apparatus onto an outer surface.

9. The holding apparatus of claim 7, wherein the rotating angle is not over 360 degrees.

10. The holding apparatus of claim 7, wherein the through hole of the pivot component is a round through hole.

11. The holding apparatus of claim 7, wherein the through hole of the pivot component is an oval-shaped through hole, the oval-shaped through hole having a minor axis, the limiting portion being located at a position of an extension direction of the minor axis.

12. The holding apparatus of claim 11, wherein a length of the minor axis is shorter than a length formed by the extending portion and the linking portion.

13. The holding apparatus of claim 7, wherein the direction is a clockwise direction or a counter-clockwise direction.

14. The holding apparatus of claim 7, wherein the carrying holder further comprises a transmitting interface electrically connected with a signal cable within the cable tunnel.

15. The holding apparatus of claim 7, wherein the carrying holder further comprises a top cap, the cap being linked with the casing and used for accommodating an electronic device.

16. The holding apparatus of claim 7, wherein the linking portion and the extending portion are formed in one piece.

* * * * *